United States Patent [19]

Pick et al.

[11] Patent Number: 4,791,523
[45] Date of Patent: Dec. 13, 1988

[54] PROTECTING AN ICEMAKER AGAINST OVERCURRENT DAMAGE

[75] Inventors: James M. Pick, Elk Grove; Brian T. Creed, Elmhurst, both of Ill.

[73] Assignee: Eaton Corporation, Cleveland, Ohio

[21] Appl. No.: 22,557

[22] Filed: Mar. 6, 1987

Related U.S. Application Data

[63] Continuation of Ser. No. 736,222, May 20, 1985, abandoned.

[51] Int. Cl.$^4$ .............................................. H02H 5/04
[52] U.S. Cl. .................................... 361/104; 335/141; 361/99; 361/105
[58] Field of Search ................. 335/141, 281; 336/96, 336/205; 361/24, 37, 41, 99, 103, 104, 105

[56] References Cited

U.S. PATENT DOCUMENTS

| | | | |
|---|---|---|---|
| 3,585,450 | 6/1971 | Lane | 361/41 |
| 3,691,425 | 9/1972 | Weyrich et al. | 361/104 |
| 4,112,405 | 9/1978 | Joseph | 335/142 |
| 4,454,544 | 6/1984 | Coleman | 361/41 |
| 4,476,451 | 10/1984 | Kosugi | 335/281 |

*Primary Examiner*—A. D. Pellinen
*Assistant Examiner*—Jeffrey A. Gaffin
*Attorney, Agent, or Firm*—R. A. Johnston

[57] ABSTRACT

A wound bobbin coil (A) and a fuse (B) are interconnected electrically in series. The coil and the fuse are mounted closely adjacent and molded into a tough, nylon encapsulation (C). The series connected coil and fuse are connected with electrical terminals (26, 30) to form a unitary electrical component which is readily connected with associated circuitry. In this manner, when the coil becomes damaged sufficiently to blow the fuse, both the coil and the fuse must be replaced. A repairman cannot short the fuse or merely replace the fuse and allows a damaged coil to continue functioning. In the preferred utilization of the present coil in a freezer compartment ice maker, coil failures can cause flooding, overheating, and other catastrophic damage to a refrigerator/freezer.

7 Claims, 1 Drawing Sheet

PROTECTING AN ICEMAKER AGAINST OVERCURRENT DAMAGE

This is a continuation of U.S. patent application Ser. No. 06/736,222 filed May 20, 1985, which is now abandoned.

BACKGROUND OF THE INVENTION

The present invention relates to electrical coils. It finds particular application in conjunction with water valve actuator coils for ice makers and will be described with particular reference thereto. However, it is to be appreciated that the invention has other applications including actuators for water valves and other appliances, other valve actuators, pull solenoids, other solenoid coils, and the like.

Heretofore, solenoid coils have been utilized to operate water feed valves for home freezer ice makers. To prevent the water supply system from failing with the valve open and flooding the freezer, the actuator coil was designed to burn out and fail when actuated for an excessive duration. The actuator coil was operated at a relatively high wattage such that the current passing through the coil generated a significant amount of heat. As the heat in the coil built, the insulation would start to melt shorting out windings of the coil. The shorting out of some of the windings would reduce the effective resistance of the coil increasing the current flow and generated heat yet more rapidly. A section of the coil wire would rapidly melt under the increasingly higher current and form a break in the electrical circuit. Termination of the current flow eliminated the actuating magnetic flux of the water valve coil allowing the valve to close. In this manner, the inlet water valves for the ice cube makers were designed to burn themselves out if actuated for significantly longer than the fill duration of the ice cube maker.

However, it was also found to be advantageous to connect the water valve actuator coil electrically in series with another resistive load, particularly a heating rod. The heating rod was conventionally actuated to melt the surface of the frozen ice cubes immediately prior to ejection. Although placing the heating rod in series with the valve actuator coil had certain advantages, the series connection changed the failure characteristics of the actuator coil. In particular, the actuator coils no longer burnt out. The coil windings would still heat and start shorting out and reducing the resistance of the coil after the coil had been actuated for an excessive duration. When the coil was connected in series with the resistive load of the heating rod, an effective voltage divider was constructed. The voltage divider limited the amount of power dissipated by the coil. As the coils shorted decreasing the resistance of the coil, more heat was generated by the heating rod and less by the coil. The coil did not burn out.

As the coil shorted out in the series connected coil and the heating rod, the coil was left with too few turns to generate sufficient magnetic flux to open the valve. Accordingly, the actuator coil still failed to maintain the water supply valve open significantly after the normal fill time. However, the coil still continued to conduct current to the heating rod. Thus, even although the water valve failed and closed, electrical current was still applied to the heating rod. Continuous operation of the heating rod converted power into heat at an increasing rate as the windings of the coil shorted out, overheating the ice maker and the freezer. The overheating heating rod would cause the plastic liner of the freezer and other appliance parts to be melted, thus destroying the appliance. Thus, the ice maker was protected from failing into a flood mode at the risk of failing into a mode which caused extensive thermal damage to the freezer or refrigerator.

The present invention provides a new and improved actuator coil which overcomes the above-referenced problems and others. When used in conjunction with a series connected water supply valve actuator coil and heating rod, the present invention protects against both flood damage and excessive heating damage.

SUMMARY OF THE INVENTION

In accordance with the present invention, a coil construction is provided. A coil and a fuse, or other current passage terminating means, are connected electrically in series. A casing encapsulates both the coil and the fuse providing a unitary coil and fuse construction.

In accordance with a more limited aspect of the present invention, a fail safe wound bobbin coil for controlling an ice cube maker water valve or the like is adapted to be connected in series with an inductive load, such as a heating rod for softening the surface of formed ice cubes in the ice cube maker. The coil includes a plurality of wire windings or turns of a gauge which heats with the normal actuation current flowing therethrough. The wire is coated with an insulation that fails with heat in such a manner that the windings tend to short with actuation in excess of a normal duration. In this manner, the coil loses sufficient flux density that it can no longer maintain the water refill valve open allowing the valve to close and flooding to be prevented. The magnitude of the current flow through the coil increases as the windings short. A fuse which opens in response to a current above the normal actuation current is connected in series with the coil. In particular, the fuse is connected between a first end of the coil and a first electrical connection terminal. A second electrical connection terminal is connected with the other end of the coil. A molded plastic encapsulation seals both the coil and the fuse therein. The first and second electrical terminals are mounted to the capsulation, each with a free end extending therefrom. Suitable electrical connectors interconnect the free end of the terminals with the heating rod, the control circuit, or the like.

A primary advantage of the present invention is that it provides fail safe protection for a coil which is connected in series with another impedance.

Another advantage of the present invention is that it protects ice cube makers from failing catastrophically, such as by flooding, overheating, or otherwise damaging the freezer and its contents.

Yet another advantage of the present invention is that it inhibits improper repairs, particularly repairs which inappropriately attempt to extend the life of a damaged and malfunctioning coil.

Still further advantages of the present invention will become apparent to others upon reading and understanding the following detailed description of the preferred embodiment.

BRIEF DESCRIPTION OF THE DRAWINGS

The invention may take form in various parts and arrangements of parts. The drawings are only for purposes of illustrating a preferred embodiment of the invention and are not to be construed as limiting it.

Wherein, the figures show.

DETAILED DESCRIPTION OF THE PREFERRED EMBODIMENT

Figure 1:
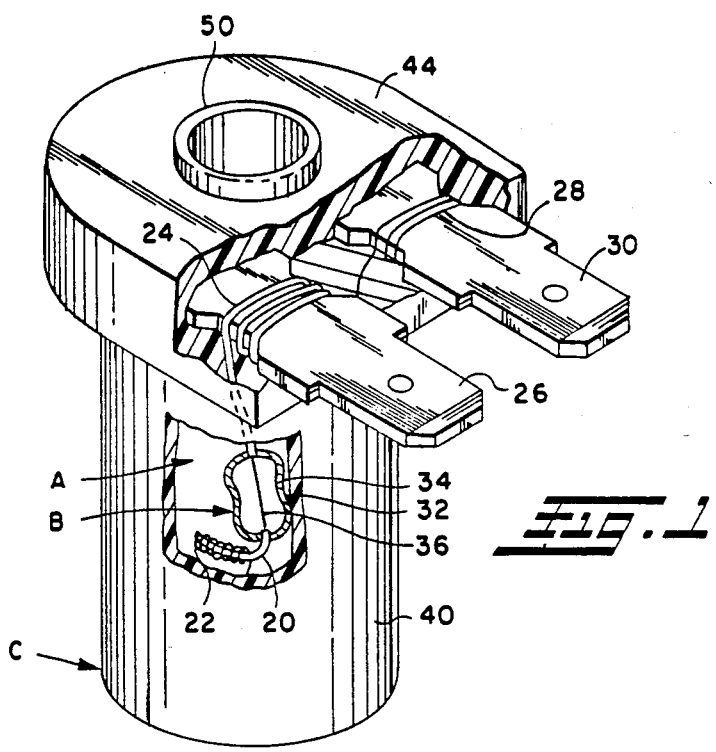
FIG. 1 is a prospective view in partial section of a combined coil and fuse construction in accordance with the present invention.
Figures 2, 3:
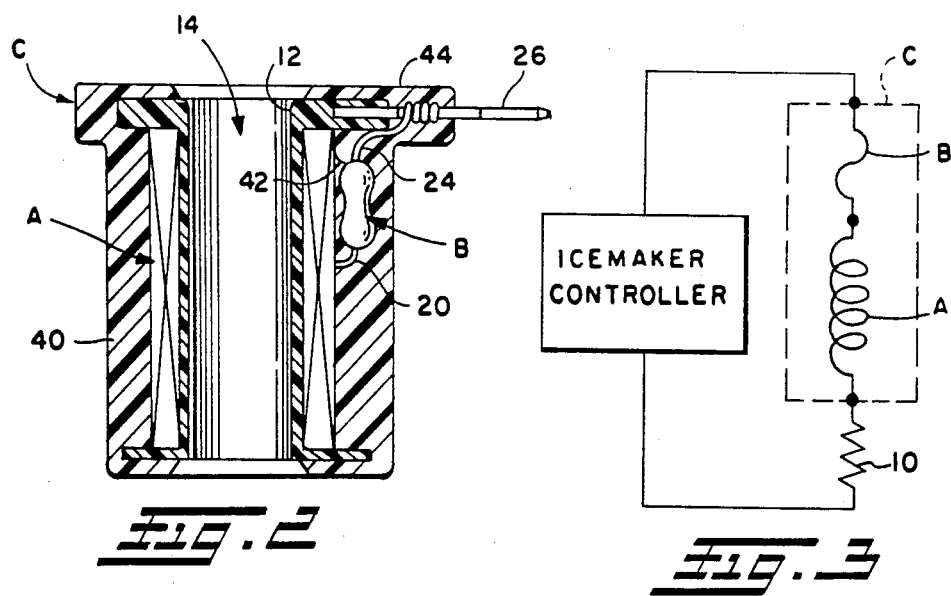
FIG. 2 is a side elevational view of the coil of FIG. 1 in full section.
FIG. 3 is a circuit diaphragm illustrating a preferred electrical circuit combination incorporating the present invention; and, FIG. 4 is an enlarged section of a portion of the coil windings.

With reference to FIGS. 1 and 2, a coil A is connected electrically in series with a current terminating means or fuse B. A molded plastic casing or encapsulation C surrounds and encapsulates both the coil A and the fuse B to provide a sealed, unitary construction. Optionally, the casing may be string wound, tape wound, and the like. In some applications, the casing may be omitted. In this manner, the series connected coil and fuse provide a unitary construction which are interconnected as a unit with associated circuitry. Further, the unit must be replaced with the failure of either the coil or the fuse or both.

In an ice maker, the water fill valve should never be operated for longer than the fill duration. Longer than normal operation of the coil of the water fill valve can cause water to overflow the ice maker and flood the freezer and refrigerator. To prevent this catastrophic flood, the current terminating means terminates the flow of current to the coil after a preselected duration that is slightly longer than a normal actuation or water fill duration. Specifically, after the normal actuation duration, the windings are becoming sufficiently hot that the insulation is starting to fail. With continuing actuation, the insulation fails and windings short out removing the shorted windings from the electrical circuit along with their associated resistance. This increases the current flow through the remaining coils, hence accelerates the heating and the shorting of additional windings. Quickly, sufficient windings are removed from the electrical circuit that the coil generates insufficient magnetic flus to operate the water fill valve. The water fill valve closes and catostrophic flooding is prevented.

With reference to FIG. 3, the coil A is preferably connected in series with a significant impedance 10, such as a heating rod for melting the surface of frozen ice cubes to facilitate their ejection from the ice cube maker. Because the coil and the impedance are connected in series, they form a voltage divider. As the windings of the coil short, the impedance of the coil is reduced and the relative division of the voltage across the voltage divider shifts. That is, as each winding shorts out, the current increases but a larger percentage of the electrical energy is dissipated as heat in the heating rod than in the coil. When the impedance of the coil becomes small relative to the impedance of the heating rod, the heating rod limits the magnitude of the current flowing through the coil and the heating rod. This limiting of the current prevents the coil from becoming so hot that the copper wire melts. Rather, current continues to flow at a higher than normal magnitude through both the coil and the heating rod causing the heating rod to generate heat continuously. The current terminating means B terminates the current flow at a preselected current level which is greater than the normal actuating current and less than the limit current. In this manner, the current terminating means or fuse B terminates the flow of current through the coil A soon after the normal actuation duration.

Figure 4:
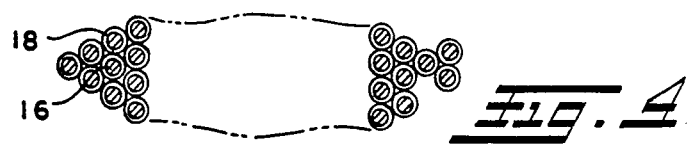

With reference to FIGS. 2 and 4, the coil A includes a bobbin 12 which defines an armature receiving passage 14 extending axially therethrough. A plurality of windings or turns of a light gauge wire 16, e.g. 40 gauge wire, are wound around the bobbin. The gauge of the wire is selected relative to the actuating voltage and current such that internal resistance heating warms the coil windings. The coil windings are coated with an insulation 18, such as solderable polyurethane insulation, which degrades or vaporizes at elevated temperatures.

With particular reference to FIGS. 1 and 2, the coil A is connected in series with the current terminating means or fuse B. The fuse prevents the heating rod 10 from continuing to operate and cause heat damage to the ice maker and freezer as the coil insulation fails shorting more windings and sending more current through the heating rod. The fuse B includes a first lead 20 which is connected with a first end 22 of the coil. A second fuse lead 24 is electrically connected with a first electrical connection terminal 26. A second end 28 of the coil is connected with a second electrical connection terminal 30.

The fuse B further includes a ceramic shell 32 which defines a sealed space 34 therein. A fuse wire or element 36 extends through the space 34 between the leads 20 and 24. The fuse element is selected such that it melts and terminates the flow of electrical current therethrough when the current exceeds the normal operating current of the coil, i.e. after some of the coil windings have shorted. In the preferred embodiment, the fuse element is chosen to blow or melt at $\frac{3}{4}$ ampere. In this manner, the space surrounding the fuse element thermally insulates the fuse element from potential heat sinks that would alter its meltdown characteristics, i.e. increase the amperage at which it failed.

The encapsulation C is injection molded with a plastic material, preferably nylon. The encapsulation includes a generally cylindrical wall 40 of sufficient thickness to provide protection from impact and other contact which might damage the delicate coil windings. Moreover, the molded plastic encapsulation provides a hermetic seal which protects the coil and fuse from moisture. This protects the coil from the formation of ice crystals or frost which are commonly found in refrigerator compartments.

The encapsulation wall 40 defines a small well 42 surrounding the fuse B. The wall surrounding the well 42 is sufficient thickness to provide impact protection and hermetic sealing. The encapsulation further defines an enlarged, extending upper portion 44 which provides support to the first and second electrical connection terminals 26, 30. The electrical connection terminals are mounted in a preselected relationship to facilitate the ready interconnection with a two socket electrical receptacle.

In this manner, both the fuse and the coil are interconnected with a single, two socket receptacle. If the fuse and coil were separate components, each would require a pair of terminals. A jump lead with sockets on either end would be required to interconnect the fuse and coil. Such interconnection would provide a significant extra cost in both parts and labor. Moreover, such separate mounting would enable a repairman to replace only a blown fuse and not the defective coil which caused the fuse to blow. An ice maker with a defective coil and a new fuse might operate for several operations but at an increased risk of flooding or other catastrophic failure. Worse yet, someone might short the fuse terminals bypassing the fuse and enabling the ice maker to function again but with no fuse protection against flooding, overheating, and catastrophic failures. Thus, a separate fuse and coil would render the combination more susceptible to incomplete and dangerous repairs.

In the preferred embodiment, a ferrous sleeve 50 is inserted through the axial passage 14 of the coil as the coil is mounted on a mounting bracket. The metal sleeve provides a magnetic flux path surrounding an armature receiving passage defined therein.

The invention has been described with reference to the preferred embodiment. Obviously, modifications and alterations will occur to others upon reading and understanding the preceeding detailed description. For example, fuses and current terminating devices of other types might be utilized. A length of wire of a lighter gauge than the coil, e.g. No. 46 wire, might be connected in series with the coil to function as a fuse. The length of No. 46 wire might be surrounded by a bubble or gap in the encasement such that the plastic does not act as a heat sink to cool the fuse wire. Other fuse elements might include a carbon resistor which burns out above a preselected amperage, a foil strip, a resettable circuit breaker, a bi-metallic element, and the like. It is intended that the present invention be construed as including all such alterations and modifications in so far as they come within the scope of the appended claims or the equivalents thereof.

Having thus described the preferred embodiment, the invention is now claimed to be:

1. An assembly for a refrigerator icemaker comprising:
   (a) an electrically operated coil adapted for actuation of an electromagnetic water fill valve upon normal operating current flow, said coil having a plurality of turns therethrough of relatively fine wire having the size chosen such that upon flow of normal operating current therethrough a desired magnetomotive force is produced and upon flow of said normal operating current in excess of a predetermined time, said coil being heating and undergoes successive shorting of windings thereby decreasing the electrical resistance of said coil and increasing current flow therein, said coil operative upon said decreasing resistance for de-actuating a water fill valve
   (b) heater means electrically series connected with said coil and operative for heating ice for removal from a tray, said heater means having a greater resistance then said coil and acting as a voltage divider and a current limiter to prevent coil burnout despite said shorting; and,
   (c) circuit protective means series connected to said heater means and operative upon said coil decreasing resistance for terminating current flow through said heater means.

2. A control system for a refrigerator icemaker comprising:
   (a) an electrically operated coil adapted for actuation of an electromagnetically actuated coil for controlling ice maker waterfill, said coil having a known impedance and defining an armature receiving cavity and having a plurality of turns of relatively fine wire chosen such that the turns increase in temperature and successively short out in the event a normal operating current continues to flow for a time greater than a predetermined normal waterfill cycle time, said shorted coils operative to decrease the impedance of said coil and the magnetomotive force sufficient to cause said valve to be electromagnetically deactuated and operative to permit current greater than a normal operating current to flow therethrough;
   (b) heater means electrically series connected with said coil and operative to perform an ice melting function upon flow of a normal operating current therethrough, said heater means operative as a voltage divider with said coil having an impedance higher than said coil such that said heater acts as a current limiter for said coil and said coil upon said coil shorting continues flow of greater than normal current and is prevented from overheating and acting as a fuse;
   (c) current terminating means electrically series connected with said heater means, said terminating means operative to create an open circuit only when a predetermined limit current above normal operating current flows in said heater means; and,
   (d) controller means, operative to effect switching of current to said coil for normal ice maker waterfill.

3. The assembly defined in claim 2, wherein said coil and current terminating means are commonly encapsulated with plastic material.

4. An appliance control system comprising:
   (a) a solenoid coil having an impedance and defining an armature receiving cavity and having a plurality of turns of relatively fine wire chosen such that, upon flow of a normal operating current therethrough a magnetomotive force is provided sufficient for effecting a first operating function, said coil turns, upon said normal current flowing continuously beyond a predetermined threshold interval of time, subject to shorting out of successive turns, whereupon said coil impedance drops and said coil becomes inoperative to effect said first appliance function;
   (b) heater means electrically series connected with said coil and, upon flow of said normal operating current therethrough for a time interval less than said threshold, said heater means operative to effect a second appliance function, said heater means and said coil forming a voltage divider whereby when said coil impedance drops current through said heater continues and increases to a greater than normal level;
   (c) fusing means electrically series connected with said heater means and coil and operative to maintain current in said heater means as said coil impedance drops and to go open circuit only when the current in said heater means reaches an unacceptable level; and,
   (d) controller means connected in circuit with said coil, said heater means and said fusing means, said controller means operative to switch power to said heater means, coil and fusing means in a predetermined program for effecting said first and second appliance functions.

5. The control system defined in claim 4, wherein said coil and fusing means are encapsulated commonly in plastic material.

6. The assembly defined in claim 4, wherein said coil is encapsulated in plastic material and includes a pair of electrical connection terminals extending from the plastic encapsulation for interconnection with an electrical socket, the electrical terminals being connected in series with the coil and the current terminating means.

7. The assembly defined in claim 4, wherein said coil and fusing means are encapsulated commonly in plastic material and said fusing means includes a shell defining an air space therein and a fuse element extending through its shell air space.

* * * * *